F. C. H. MÜLLER.
CASTELLATING MACHINE.
APPLICATION FILED APR. 24, 1919.

1,369,121.

Patented Feb. 22, 1921.

4 SHEETS—SHEET 1.

INVENTOR
Ferdinand C H Müller
by
Owen, Owen + Crampton

F. C. H. MÜLLER.
CASTELLATING MACHINE.
APPLICATION FILED APR. 24, 1919.
1,369,121.
Patented Feb. 22, 1921.
4 SHEETS—SHEET 2.
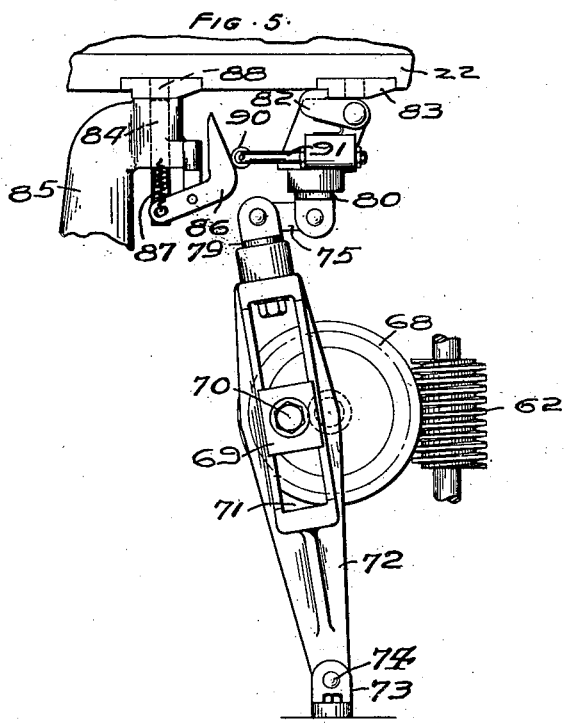
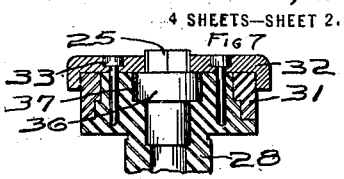
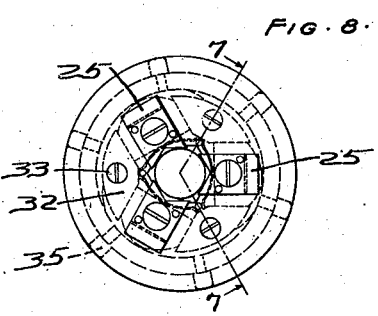
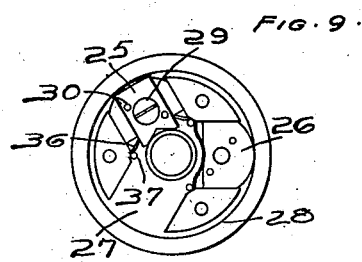
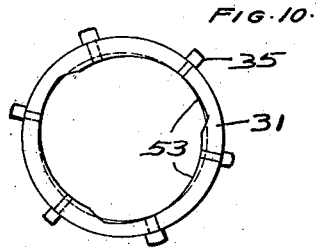
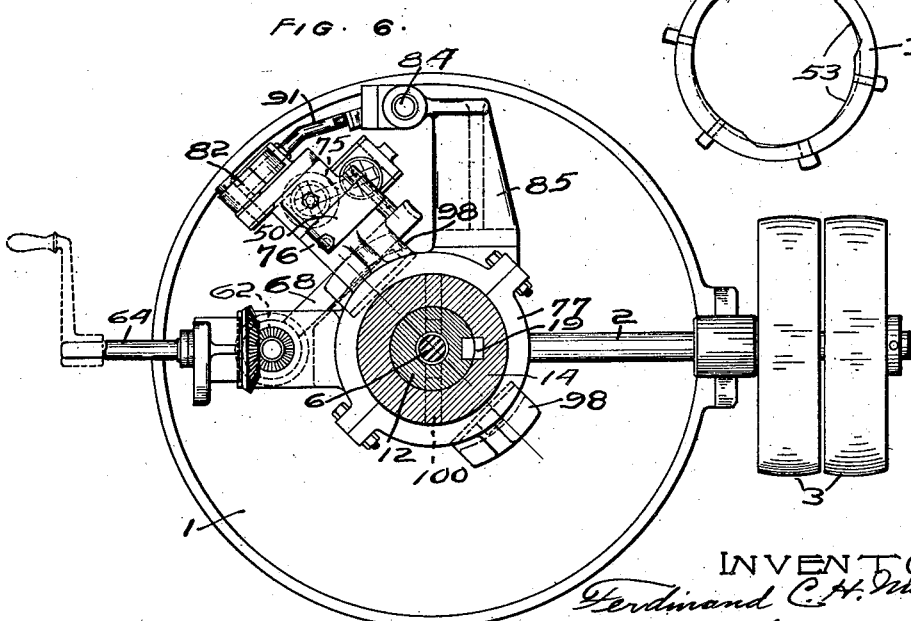
INVENTOR
Ferdinand C. H. Müller
by
Owen, Owen & Crampton

F. C. H. MÜLLER.
CASTELLATING MACHINE.
APPLICATION FILED APR. 24, 1919.

1,369,121.

Patented Feb. 22, 1921.

4 SHEETS—SHEET 3.

INVENTOR.
Ferdinand C. H. Müller
by
Owen, Owen & Crampton

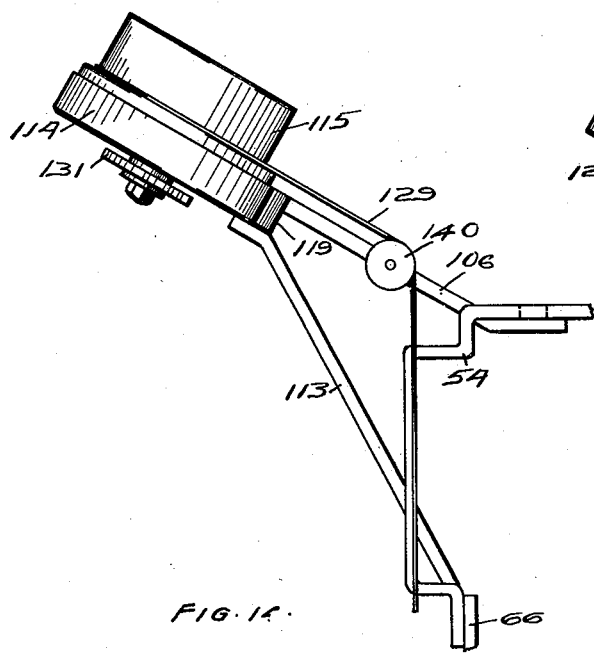
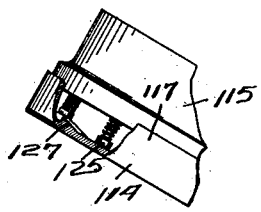
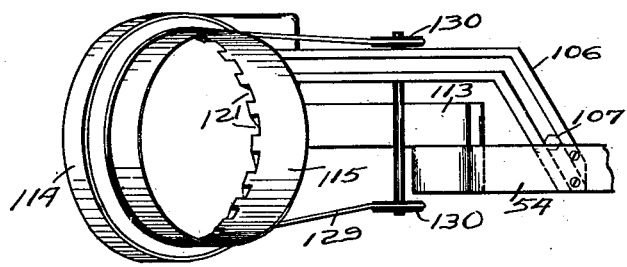

UNITED STATES PATENT OFFICE.

FERDINAND C. H. MÜLLER, OF SANDUSKY, OHIO, ASSIGNOR TO THE MATTHEWS ENGINEERING COMPANY, OF SANDUSKY, OHIO, A CORPORATION OF OHIO.

CASTELLATING-MACHINE.

1,369,121.   Specification of Letters Patent.   Patented Feb. 22, 1921.

Application filed April 24, 1919. Serial No. 292,402.

*To all whom it may concern:*

Be it known that I, FERDINAND C. H. MÜLLER, a citizen of the United States, and a resident of Sandusky, in the county of Erie and State of Ohio, have invented a certain new and useful Castellating-Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to an automatic machine for producing castellated nuts. It has for its object to produce a machine that is efficient, and one that may be readily assembled and disassembled.

The invention may be contained in different forms of construction. To illustrate the application of my invention, I have selected a construction containing the invention and shall describe it hereinafter. The construction selected is illustrated in the accompanying drawings.

Figure 1:
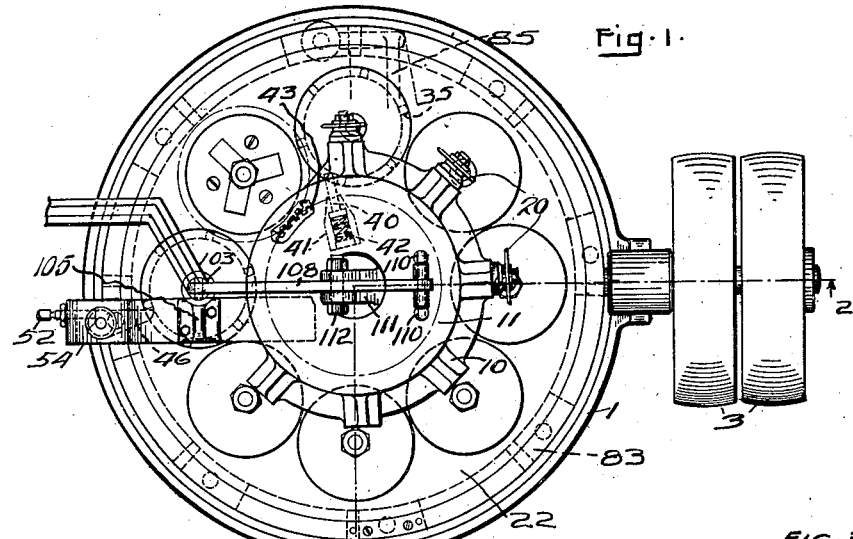
Figure 2:
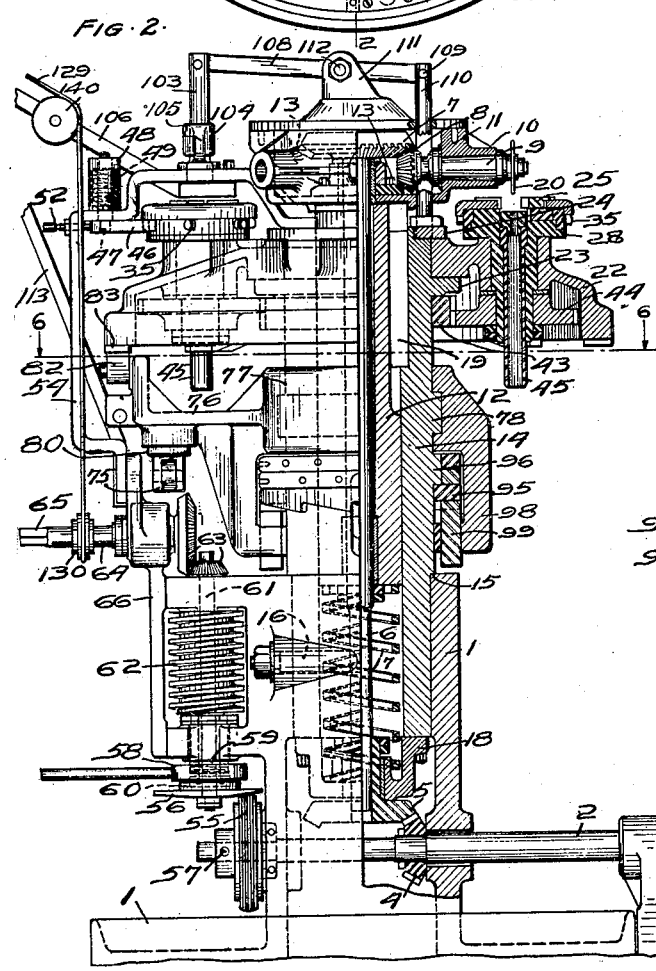
Figure 3:
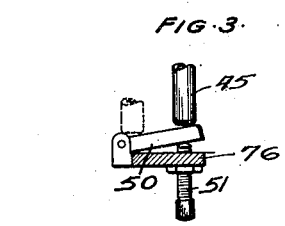
Figure 4:
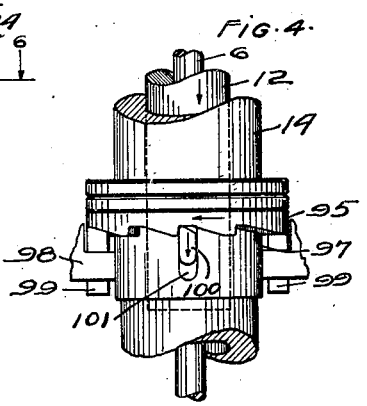
Figure 11:
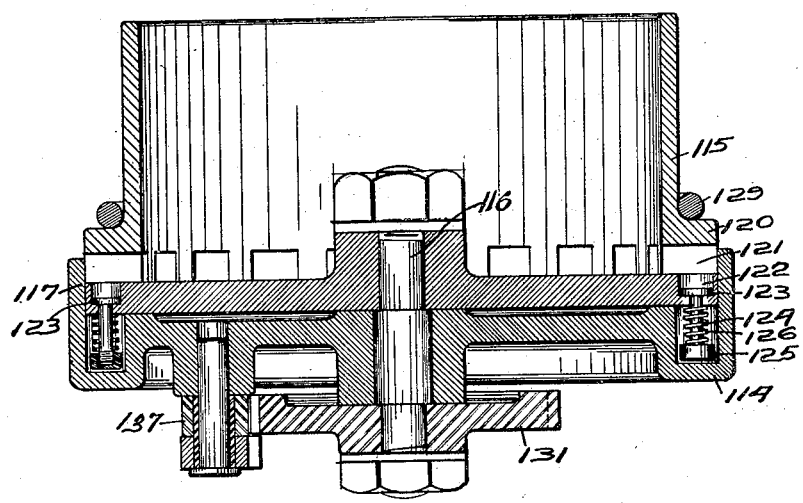
Figure 12:
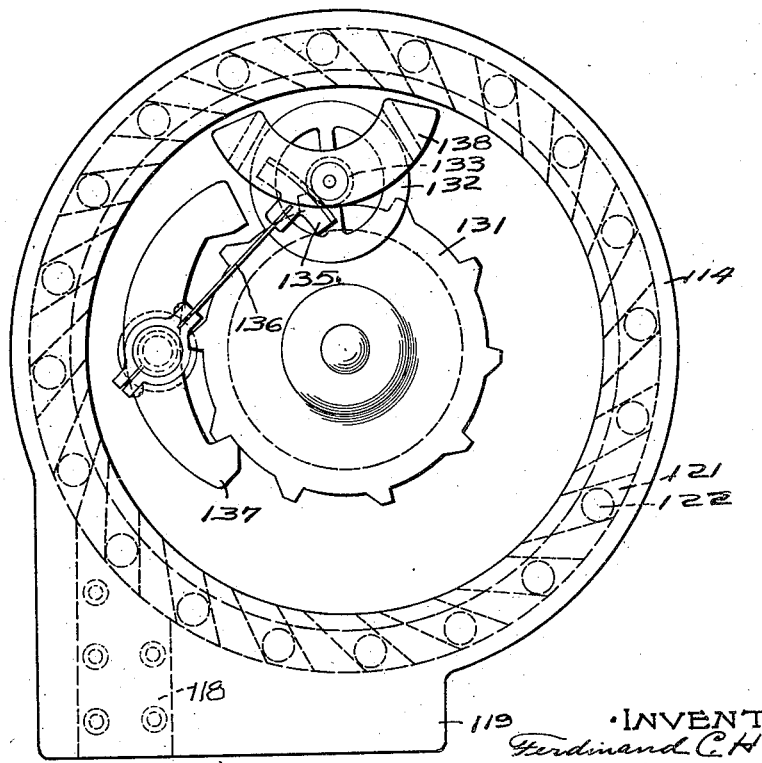

Figure 1 of the drawings illustrates a top view of the machine, Fig. 2 illustrates a side view and a half sectional view taken on the line 2—2 indicated in Fig. 1. Fig. 3 illustrates a part of an ejecting mechanism. Fig. 4 illustrates a part of the step by step mechanism for moving the cutters to and from the chucks. Fig. 5 is also a part of the step by step mechanism for moving the chucks. Fig. 6 is a top view of the lower part of the machine illustrated in Fig. 2 taken on the line 6—6 indicated in Fig. 2. Fig. 7 is a vertical sectional view of the chuck taken on line 7—7 indicated in Fig. 8. Fig. 8 is a top view of the chuck. Fig. 9 is a partial assembled top view of the chuck. Fig. 10 illustrates a chuck cam ring. Fig. 11 is a sectional view of the hopper. Fig. 12 is a bottom view of the hopper. Fig. 13 is a side view of the hopper showing the manner of its attachment. Fig. 14 is a top perspective view of the hopper showing its connection with the chute. Fig. 15 is a broken view of the hopper, showing the manner in which nuts improperly placed in the hopper for delivery into the chute are ejected from their position. Fig. 16 illustrates a nut before castellation.

In the figures, 1 is the supporting base for supporting the mechanism. 2 is the driving shaft having the idle and driving pulleys 3. A bevel gear wheel 4 is keyed to the shaft 2 and operates upon the bevel gear 5 which drives the shaft 6 to which it is keyed. The bevel gear 7 is keyed to the upper end of the shaft 6. The beveled gear 7 operates upon the beveled gears 8. The bevel gears 8 are keyed to shafts 9 supported in bosses 10 formed on the head 11 which is secured to a sleeve 12 by means of bolts 13. The sleeve 12 moves vertically in a sleeve 14 which is provided with a shoulder 15 that rests upon a part of the supporting base 1 in which it tightly fits and may be tightly secured by a slot cut into the base 1 and clamped with the bolt 16. The sleeve 12 is supported on a spring 17 that is located intermediate the end of the sleeve 12 and the inverted cap 18, which is secured to the lower end of the sleeve 14 that forms a bearing for the gear wheel 5. The gear wheel 5 is slip-keyed to the shaft 6 and the sleeve 12 is slip-keyed to the sleeve 14 by the key 19. Cutting disks 20 are keyed to the shaft 9. By this arrangement the head 11 and the shaft 6 may be raised and lowered relative to the sleeve 14, while the gear wheels 8, the shafts 9 and the cutters 20 may be rotated by the shaft 2 and the gear wheels 4 and 5.

The nuts castellated by the cutting operation of the cutters 20 are secured in chucks that are moved step by step intermediate the cutting operations that are performed by the cutters 20. Inasmuch as the machine selected for purposes of illustration is for castellating hexagonal nuts, eight chucks are supported on the shell 22 and six cutters are supported and driven in the head 11. The chucks, in complete operation, take eight positions, six cutting positions, nut ejecting position and nut receiving position. The shell 22 is located beneath the head 11 and is rotatably mounted on the sleeve 14. The sleeve 14 is provided with a bearing flange 23 on which the shell 22 is supported. A spanner nut 24 secures the shell in position. The chucks are supported in bosses formed on the upper side of the shell 22. Each chuck is provided with three clamping jaws 25, which are secured to guiding blocks 26 located in a three way channel 27 cut in the upper end of the body 28 of the chuck. The jaws 25 are secured to the guide blocks 26 by means of screws 29 and pins 30. Around the outside of the upper end of the chuck body 28 is located a cam ring 31 which is provided with three inner cam shaped surfaces 53 that operate upon the blocks 26 to move the jaws 25 toward the axis of the chuck according to the extent of the circular movement of the ring 31. The ring 31 and the blocks 26 are secured in position but in such a way as to permit their relative movements by the top plate 32, which is secured to the body of the chuck 28 by means of the screws 33. The ring 31 is provided with pins 35 for the purpose of rotating the ring 31 to close the jaws and permit the jaws to be opened. Band springs 36 are located intermediate pins 37 and the guide blocks 26. The band springs 36 operate to keep the blocks 26 against the cam surfaces of the ring 31 and when the cam ring is turned in one direction, the band springs 36 operate to open the jaws 25 of the chuck.

The chucks are opened after all of the cutting operations have been performed on the nut. They are opened by means of the pin 40 which is located in a sleeve 41 that is spring pressed by means of a spring 42 located intermediate the head of the pin 40 and the bottom of the sleeve 41. Each time the chucks are moved in their step by step movements they are rotated 60° to place the nuts in position to be cut radially on one side of the top portion to be castellated. The chucks are rotated by means of a rack 43 that is secured to the sleeve 14 and the gear wheels 44 that are keyed to the body 28 of the chucks. When the chucks are about to leave the last cutter, the pin 40 being located in the path of movement of the pins 35 of the chucks, engage the pins 35 and cause the rings 31 to rotate which unloosens the chuck jaws by the operation of the springs 36. An ejector 45 is located in the chuck body 28 and as the chuck passes from the seventh position, the ejector 45 is pushed upward which pushes the nut out of the chuck. The chuck then arrives at the eighth position beneath the chute whence it receives the nut. When the chuck starts to the first position for cutting, one of the pins 35 is engaged by the spring pressed arm 46 which is secured to a rod 47. The rod 47 is located in the thimble or cap 48. A spring 49 also is located in the cap 48 and is connected to the rod 47 and to the cap 48 to cause the rod 46 to yieldingly press against the pins 35 of the chucks. Movement of the arm 46 by the operation of the spring 49 is limited by the screw 52. The arm is provided with a shoulder that strikes the end of screw when it is returned to its normal position by the operation of the spring. As the chucks pass the arm 46, the pins 35 are engaged and the chuck jaws are tightened by the operation of the spring 49 until the pins can push by the end of the arm 46. The chucks then preceed in their progressive step by step movement beneath the cutters 20 until the ejectors 45 ride up on the plate 50 which is supported beneath the shell 22 and in the path of movement of the ends of the ejectors 45.

The position of the plate, that is, its inclination is adjusted by means of the screw 51.

The shell 22 and consequently the chucks are caused to make step by step movements by means of an oscillating mechanism that may be actuated by the shaft 2, or may be actuated by hand. The mechanism may be frictionally driven by means of the friction wheel 55 which is keyed to the shaft 2 and the friction disk 56. The movement of the oscillating mechanism may be varied according to the position of the wheel 55 on the shaft 2 relative to the center of the disk 56. The friction wheel 55 may thus be adjusted along the shaft by the key screw 57 to obtain the desired relative speed rates. The friction disk 56 may be released from the friction wheel 55 by means of a ring 58 that is threaded onto a sleeve 59, and which may be turned on the sleeve 59 to press against the upper side of the disk 56 to release it from or push it tightly against the friction wheel 55. Ball bearings 60 may be located intermediate the ring 58 and the disk 56. The disk 56 is keyed to a shaft 61 to which is also keyed a worm 62. The shaft 61 has its support in bearings located in the base 1. Beveled gear wheels 63 connect the shaft 61 with the shaft 64. The shaft 64 may be provided with a squared end 65 to which may be attached a crank for the rotation of a shaft 64 and consequently rotation of the shaft 61 for the purpose of driving the shaft 61 and the worm 62 by hand. The shaft 64 is supported in a bracket 66 that is secured to the base member 1 in any suitable way.

The worm 62 operates upon a worm wheel 68 which is rotatably supported on a pin located in the base member 1. The worm wheel 68 is provided with a block 69 which is rotatably connected to the worm wheel 68 by means of the crank pin 70. The block 70 is provided with channeled guide ways and moves in the slot 71 formed in the swinging member 72. The lower end of the swinging member 72 is pivoted between a pair of ears or lugs 73 and is secured therein by the pin 74. The upper end of the swinging member 72 is connected by means of a link 75 to an arm or shelf 76 connected to or forming a part of a ring 77. The ears 73 are bolted to the base 1 and the ring 77 is formed of two parts which are bolted together about the sleeve 14. The ring is secured from longitudinal movements along the sleeve 14 by means of the rings 78 that fits into a channel formed into the interior face of the ring. The oscillating member 72 swings in a plane at right angles to the swinging movements of the shelf 76 that forms a part of the ring 77. These relative movements are permitted by pivoted pins 79 and 80 located respectively in the oscillating member 72 and the shelf 76. As the oscillating member 72 is swung back and forth across the face of the worm gear wheel 68, the ring 77 is moved back and forth around the sleeve 14.

An engaging hook or dog 82 is connected to the ring 77 through the shelf 76, and the shell 22 is provided with engaging teeth or blocks 83 around its periphery or its lower edge that are engaged by the dog 82 as it moves to and fro by the operation of the oscillating member 72. There are eight of the blocks 83 that are engaged, and these are so disposed as to bring the nuts in the chucks in the desired position relative to the cutters 20 from time to time upon the completion of the cutting operations of the cutters. During the cutting operations, the shell 22 and consequently the chucks are locked in position by means of a pin 84 that extends up through a bracket 85 that is secured to the base 1. The pin 84 is connected to a lever 86 that is pivoted on the bracket and is spring pressed by the spring 87 to push the pin into the holes 88 formed in the blocks 83, when the blocks have been moved by the oscillating member 72, so as to bring the holes 88 of the cutting blocks into alinement with the pin 84. The cutting operations are performed during the time that the block 69 is descending in the channel 71 and passing along the lower side of the wheel. As the block 70 passes toward the lower part of the worm gear wheel 68, the dog 82 and the shelf 76 moves toward the bracket 85. A roller 90 is connected to the bracket by an adjustable pin 91. It strikes a cam surface formed on the lever 86 and tilts the lever so as to pull the pin 84 out of the block 83 located above the bracket 85, while at the same time the dog 82 engages the block 83 in advance of the block over the bracket 85. The block 69 now travels toward the upper part of the worm gear wheel 68 and toward the worm 62, whereupon the shell 22 is moved a step forward and the pin 84 is raised until it is pressed against the lower edge of the shell 22 by the spring 87. The edge of the shell 22 rides over the end of the pin 84 until the next block 83 engages the pin 84 and pushes it down, the blocks being provided with leading inclined surfaces, until the under surface of the block rides over the pin 84 whereupon the pin 84 enters the hole 88 of the block. When the pin 84 enters the hole of the block above the bracket 85, the nuts in the chucks have been placed in the position for another side cut into the portion to be castellated. During the movement of the shell 22 by the operation of the oscillating member 72, the chucks have been turned 60° by the rack 43 and the gear wheel 44. Also one of the ejectors 45 has passed over the plate 50 located on the shelf 76 and a nut has been ejected from the chuck having the ejector, the chuck having been loosened in a preceding operation of the oscillating member 72. Also a chuck has been placed in position for receiving a nut from the hopper.

During the circular movement of the shell 22 and the chucks contained therein, the head 11 is lifted so as to lift the cutters 20 away from the nuts to permit the movement of the chucks around the sleeve 14. This is accomplished by the spring 17 that operates on the end of the sleeve 12. When the chucks have again taken cutting positions, the cutters are lowered by the operation of the cam ring 95 located beneath a shoulder 96 formed on the sleeve 14. The cam ring 95 is provided with a plurality of cam surfaces 97 and in depending arms 98 extending downwardly from the ring 77 are located dogs 99 that engage the teeth formed by the cam surfaces on the ring 95. When the ring 77 is moved to the right by the operation of the oscillating member 72 toward the worm 62, the head 11 is held above the castellating nuts by the spring 17. During the return movement of the oscillating member 72, namely, when the block 69 passes toward and around the lower side of the worm gear wheel 68, the dogs 99 move the cam ring 95 with the ring 77 to the left. Cam lugs 100 located in the slots 101 formed in the sleeve 14 and secured in the sleeve 12 operate upon the cam surfaces 97 of the ring 95, to pull the sleeve 12 down thus bringing the cutters 20 down against the nuts located in the chucks. When, however, the oscillating member 72 has completed its swing away from the worm 62, the ring 95 has been carried a sufficient distance by the operation of dogs 99 so as to permit the cam lugs 100 to be released and rise behind two of the teeth, whereupon the head 11 actuated by the spring 17 raises the cutters away from the nuts. Upon the return movement of the oscillating member 72 toward the screw 62, the shell 22 is not only moved forward another step, but also the dogs 99 have moved forward another step to engage succeeding teeth on the cam ring 95 preparatory to a succeeding swing of the oscillating member 72 during which the cam ring 95 is again moved to the left and the cutters are brought down onto the nuts.

When the cutters 20 are moved down by the downward movement of the head 11, a plunger 103 which is guided by a collar 104 located on the strip 105 forming a strip that is attached to the bracket 54 and to the top of the sleeve 14, is also brought down. The plunger 103 is located above the end of the chute 106, which is provided with an opening 107 through which the nuts pass into the chucks when they are located beneath the end of the chute 106. The plunger 103 operates to push the nuts through the opening 107 and into the chuck which has been opened as it left the sixth position. The plunger 103 is connected by a lever 108 which is fulcrumed on a cross pin 109 supported by posts 110 that pass through the head 11 and secured in the ring 24 on each side of a shaft 9. The head 11 is connected to the lever 108 by the ears 111 and the bolts 112. Upon the upward movement of the head 11, the plunger 103 is raised at the same time that the cutters 20 are raised, and upon the downward movement of the head 11, the plunger 103 passes through the end of the chute 106 to force a nut through the opening 107 and into the chuck located beneath the opening.

The nuts may be contained in a hopper that is supported on a bracket 113 which is secured to the end of the bracket 66. The base 114 of the hopper which is secured to the end of the bracket 113 supports a container 115 which is secured to the spindle 116 located in the base 114 by a suitable nut and a shoulder formed on the spindle. It fits into a flange 117 and an extension or shelf 119 formed on the base which is provided with a channel 118. The end of the chute is located in the channel and is bolted to the shelf 119, while the other end of the chute 106 is bolted to the under side of the bracket 105. The container 115 is provided with an outwardly extending ridge 120 in which are cut a plurality of channels 121 in the direction of the chute. The chute being connected to one side of the base and of the container 115, the channels are cut tangential to a circle concentric with the axis of the base and the container. The container 115 is partially filled with the nuts to be castellated, and as the base and the bottom of the container is inclined toward the chucks, the nuts slip into the channels 121. If the nuts slip into the channels 121 upside down, the nut will be caught in the channel 121 by reason of the fact that the portion to be castellated will enter holes 122 formed in the bottom of the container 115 and beneath the channels 121. If, however, the nuts slide into the channels 121 right-side up, they will be delivered to the chute 106 when the channels 121 in which they are located come into alinement with the chute. Those that are upside down will be carried around to the upper side of the container 115 and there will be ejected from the channels 121 by the operation of the plungers 123 that are located in the holes 122. The plungers 123 are provided with stems 124 on which are located nuts 125 and springs 126. The springs 126 are located between the bottom of the container 115 and the nuts 125 and operate to hold the plungers 123 in the bottom of the holes 122. The stems of the plungers move in a channel formed in the base 114 and near the upper side of the channel, and diametrically opposite to the point of connection of the upper end of the chute with the base 114, is located a cam or inclined surface 127. If the nuts enter the channel with their cylindrical portions extending downward the cylindrical portions enter the holes 122 and consequently they do not escape to the chute. The cam 127 operates to lift the plungers 123 to push the nuts that so enter the channels out of the holes when they reach the high side of the container bottom. They slide out of the channels and roll back into the container and subsequently, sooner or later, enter the channels 121 and escape through the chute. The cam 127 operating upon the plungers 123 when the channels 121 are pointed toward the chucks, that is, in a direction parallel to the upper end of the chute, the nuts will readily slide out of the channels from above the cam 127. If the plunger strikes the portions of the nuts to be castellated, they will slide back into the hopper and when they have entered the channels right-side up, they will pass over the cam surface and be delivered to the chute.

The container 115 is rotated by a belt 129 which is driven by the pulley 130 located on the shaft 64, which is in turn driven by the shaft 2 through the friction wheel 55 and the friction disk 56, or it may be driven by hand when a crank is placed on the square end 65 of the shaft 64. The belt 129 passes over the idlers 140 supported on the chute 106. A means is provided for jarring the container to keep the nuts moving and turning in order that they may be dislodged from the channels if they enter the channels improperly and may again enter the channels. An escapement wheel 131 is connected to the spindle 116 which is rotated by the rotation of the container 115. A fly wheel 132 having a pinion 133 is operated by a rack 135 supported on a spring 136 connected to an escapement lever 137. The wheel 132 is supported on the base 114 and between the base and the bracket 138. The escapement wheel 131 is preferably provided with one-half the number of teeth as there are channels so that at the end of each movement of the escapement wheel 131, it will be stopped each time the channels 121 come into alinement with the chute and by reason of the swinging movement of the wheel 132, the container is held for an instant of time, the belt being permitted to slip on the container 115, giving ample opportunity for the nuts to slip from a channel 120 when properly placed therein. The wheel 131 and the container will be held during continued movement of the wheel 132 permitted by the spring 136 and until the tension of the spring 136 overcomes the momentum of the wheel 132. Upon the return movement of the wheel 132 due to the elasticity of the spring, the escapement wheel 131 and consequently the container 115 is released and further rotated by the belt 129, until the opposite end of the escapement rocker 137 engages another tooth of the escapement wheel 131 to again stop the container 115 in position such that the succeeding channel 121 is in alinement with the chute. Moreover, the stopping and starting jars and disturbs the nuts within the container.

I claim:—

1. In a nut castellating machine, a plurality of chucks, a head, a plurality of cutters located in the head, means for moving the chucks step by step to and from beneath the cutters, a shank connected to the head, a key extending through the shank, a cam ring surrounding the shank and operable on the key for lowering the head, a spring for raising the head when the cam ring ceases to lower the head.

2. In a castellating machine, a plurality of chucks, a plurality of cutters, an oscillating member for moving the chucks, a cam ring connected to the oscillating member, means connecting the cam ring with the cutters for lowering the cutters, a wheel, means interconnecting the wheel and the oscillating member at a point intermediate the ends of the oscillating member to lower the cutters while the wheel is turning a distance greater than 180 degrees.

3. In a castellating machine, a plurality of chucks, a plurality of cutters, an oscillating member for moving the chucks, a cam ring connected to the oscillating member, means connecting the cam ring with the cutters for lowering the cutters, a wheel, means interconnecting the wheel and the oscillating member at a point intermediate the ends of the oscillating member to lower the cutters while the wheel is turning a distance greater than 180 degrees, means connected to the oscillating member for moving the chucks step by step and operated while the wheel is moving less than 180 degrees.

4. In a castellating machine, a plurality of chucks, a shell for supporting the chucks, a plurality of cutters, a head for supporting the cutters, an oscillating member, a wheel connected to the oscillating member at a point intermediate the ends of the oscillating member, means interconnecting the oscillating member, the shell and the head for moving the chucks step by step while the wheel is traveling a distance less than 180 degrees and lowering the head while the wheel is completing the rest of its revolution.

5. In a castellating machine, a plurality of chucks, a shell for supporting the chucks, a plurality of cutters, an oscillating member, means interconnecting the oscillating member and the shell for moving the chucks step by step, and means for locking the chucks in cutting positions and operated by the oscillating member to unlock said means when the oscillating member reaches a certain point in its oscillations.

6. In a castellating machine, a plurality of chucks, a plurality of cutters, an oscillating member for moving the chucks, a wheel connected to the member for swinging the oscillating member, cutters, means operated by the oscillating member for lowering the cutters during the movements of the oscillating member in one direction.

7. In a castellating machine, a plurality of cutters, and a plurality of chucks, means for intermittently moving the chucks to and from beneath the cutters, a chute for feeding the nuts to the chucks, a plunger for forcing the nuts from the chute to the chucks, means connected to the cutters and the plunger for lowering the cutters and forcing the nuts from the chute.

8. In a castellating machine, a plurality of cutters, and a plurality of chucks, means for intermittently moving the chucks to and from beneath the cutters, a chute for feeding the nuts to the chucks, a plunger for forcing the nuts from the chute to the chucks, a cam ring connected with the cutters, and a plunger for lowering the cutters and forcing the nuts from the chute.

9. In a castellating machine, a ring, means for moving the ring back and forth about its axis, a cam ring, means interconnecting the cam ring and the first named ring for intermittently moving the cam ring, cutters, means interconnecting the cutters and the cam ring for raising and lowering the cutters.

10. In a castellating machine, a plurality of cutters, a head for supporting the cutters, a shaft for driving the cutters, a sleeve for supporting the head and containing the shaft, a spring operating on the sleeve for lifting the cutters, a shell, a sleeve surrounding the first named sleeve for supporting the shell, chucks located in the shell, an oscillating member, a worm and a worm gear wheel for swinging the oscillating member, a ring surrounding the second named sleeve and connected to the oscillating member, a dog connected to the ring for engaging the shell to move the shell intermittently, means for locking the shell during the periods of rest, a cam ring, dogs interconnecting the cam ring with the first named ring to intermittently move the cam ring, lugs connected to the first named sleeve and operated upon by the cam ring to lower the first named sleeve and the head, and to permit the head to be raised.

In testimony whereof, I have hereunto signed my name to this specification.
March 13th, 1919.

FERDINAND C. H. MÜLLER.

Witness:
E. B. KING.